March 1, 1966  C. M. HART  3,238,032
WORM DRIVE FOR GLASS MACHINE
Filed May 29, 1962  3 Sheets-Sheet 1

*INVENTOR.*
CHARLES M. HART
BY Toulmin & Toulmin
ATTORNEYS

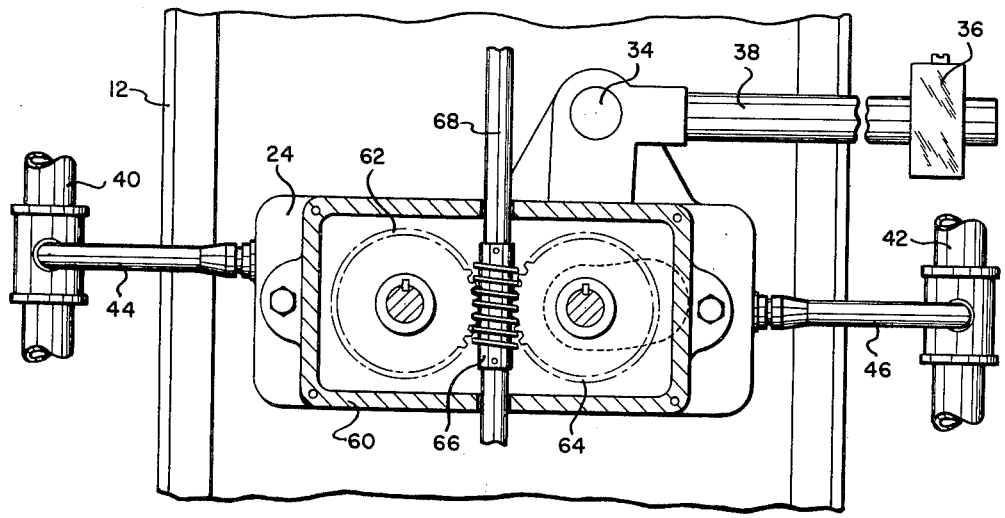
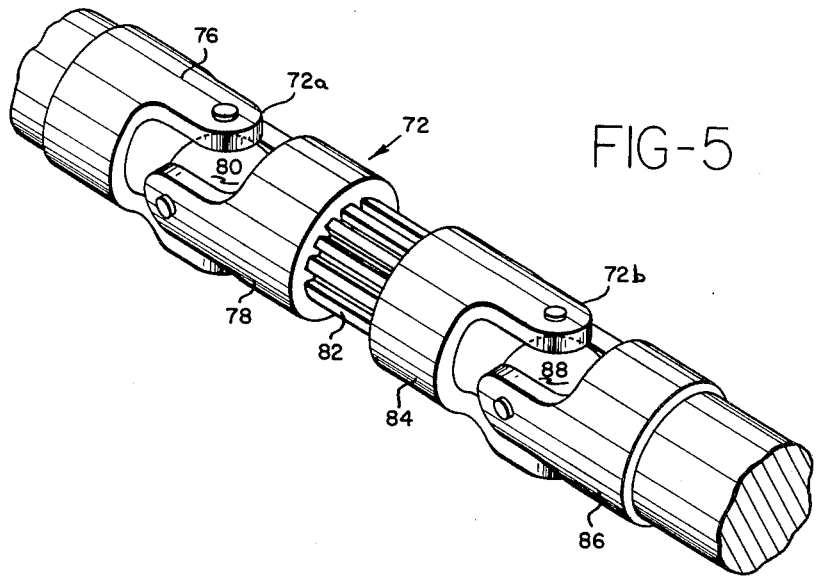

March 1, 1966   C. M. HART   3,238,032
WORM DRIVE FOR GLASS MACHINE
Filed May 29, 1962
3 Sheets-Sheet 3
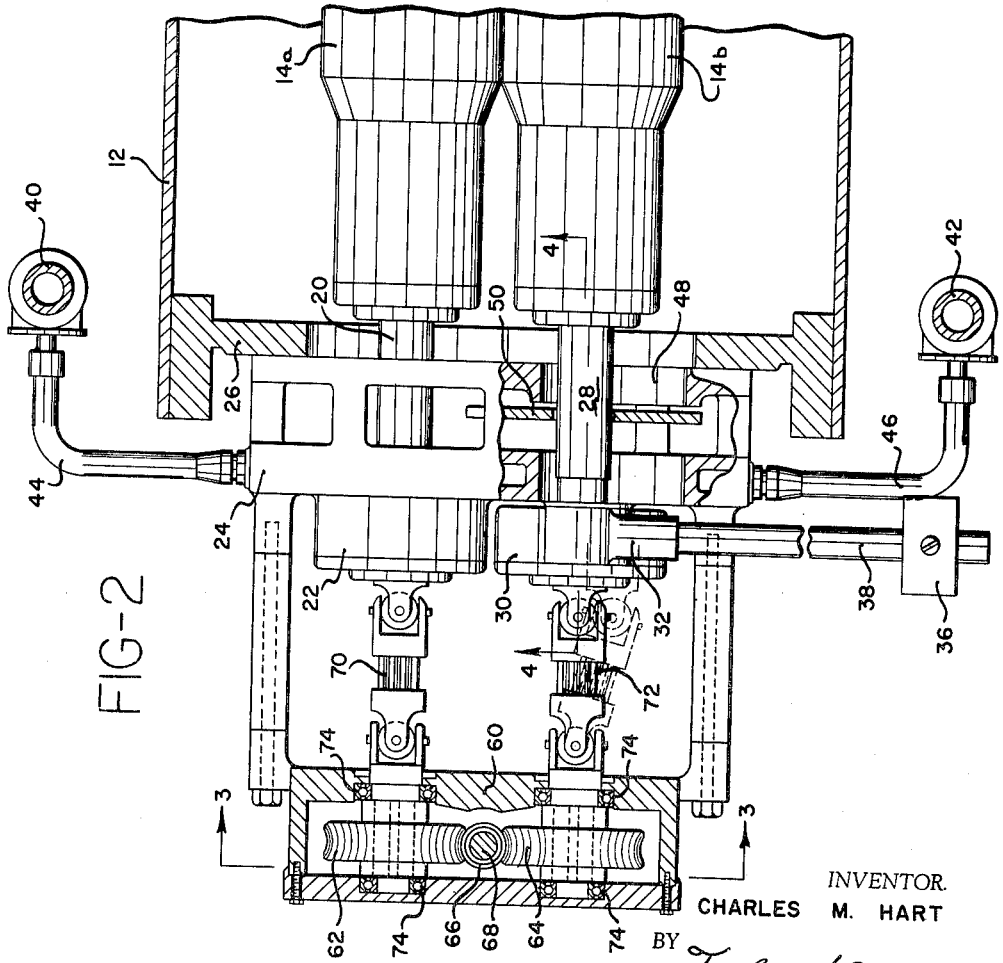
INVENTOR.
CHARLES M. HART
BY Toulmin & Toulmin
ATTORNEYS United States Patent Office
3,238,032
Patented Mar. 1, 1966

3,238,032
WORM DRIVE FOR GLASS MACHINE
Charles M. Hart, Bridgeport, W. Va., assignor to Hart Brothers Machine Co., Clarksburg, W. Va., a corporation of West Virginia
Filed May 29, 1962, Ser. No. 198,509
2 Claims. (Cl. 65—193)

This invention relates to a flexible drive arrangement and is particularly concerned with a flexible drive arrangement for glass drawing equipment, such as a glass drawing machine of the Fourcault type.

Glass drawing machines of the Fourcault type and other types, as well, are, of course, well known and include pairs of rollers between which the glass is drawn from the workpit of a glass melting furnace.

These rollers are quite often covered with asbestos or the like and serve to convey the glass sheet after it leaves the furnace and until it cools to the point that it can be cut into shorter lengths.

In the usual type of glass drawing machine, one of the rollers of each pair of rollers is fixed, and the other thereof is movable toward and away from the fixed roller when preferably under a substantially constant bias. Both rollers are driven, however, so that an effective drive arrangement must be provided drivingly interconnecting the rollers of each roller pair for rotation in unison. Heretofore, drives of this nature have taken the form of relatively complicated interconnecting chain mechanisms such as is illustrated in the Charles H. Hart patent, 2,571,239.

The present invention is particularly concerned with the drive arrangement for the roller pairs of a machine of the nature illustrated in the said patent, and the particular objective of the present invention is to provide a simplified drive arrangement which will eliminate expensive troublesome chains and which will, at the same time, provide for exact synchronism of the rollers of each roller pair and of each roller pair with the other roller pairs for the most efficient operating conditions.

Another object of the present invention is the provision of a drive arrangement for the several pairs of rollers in a glass drawing machine in which at least one of the rollers is freely movable relative to the other roller in a direction toward and away from the other roller without, in any way, interferring with the drives to the rollers.

A still further object of this invention is the provision of a drive arrangement for the roller pairs of a glass drawing machine in which the drive is flexibly connected with the rollers of each roller pair whereby to accommodate for manufacturing tolerances while, at the same time, permitting free swinging movement of one of the rollers toward and away from the other thereof.

A still further object of this invention is the provision of a drive arrangement for the roller pairs of a glass drawing machine, such as a machine of the Fourcault type, in which the drive arrangement is spaced a substantial distance from the working portions of the rollers thereby to be isolated from the heat of a glass drawing machine.

These and other objects and advantages of this invention will become more apparent upon reference to the following specification, taken in connection with the accompanying drawings in which:

FIGURE 2 is a plan sectional view indicated by line 2—2 on FIGURE 1 showing in cross section the drive according to the present invention and the connection thereof with a pair of rollers;

FIGURE 3 is a vertical sectional view indicated by line 3—3 on FIGURE 2 showing details in connection with the drive arrangement;

FIGURE 4 is a fragmentary vertical sectional view indicated by line 4—4 on FIGURE 2 showing more in detail the manner of supporting the swinging frame for the one roller; and FIGURE 5 is a perspective view showing one of the universal joint assemblies that connect the driven gears of the drive arrangement with the rollers of the drawing machine.

Figure 1:
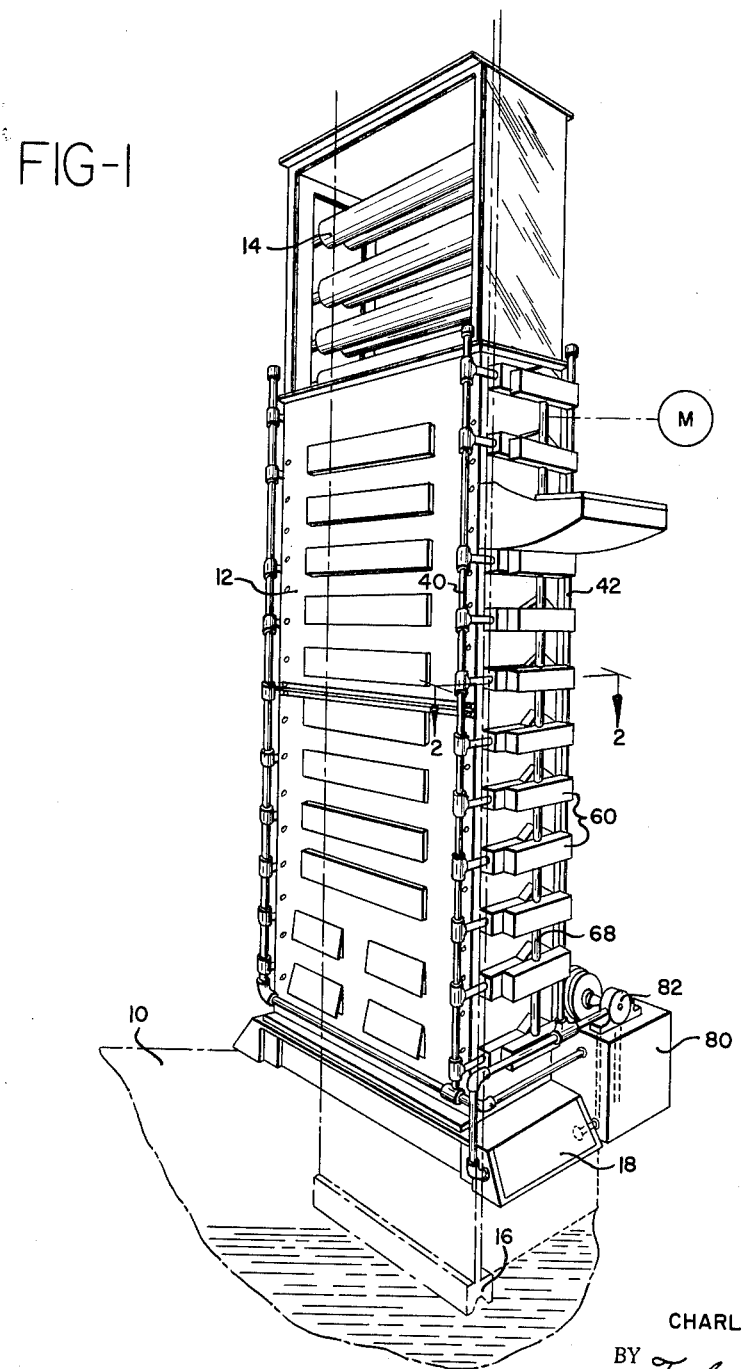
FIGURE 1 is a perspective view of a glass drawing machine embodying the present invention.

Referring to the drawings somewhat more in detail, FIGURE 1 is a vertical view of a Fourcault type machine which is located over the workpit of a glass melting furnace which is generally designated by reference numeral 10.

The machine comprises a frame 12, generally referred to as a lehr, in which is mounted a plurality of pairs of rollers 14 which are operable for drawing a sheet of glass upwardly from the furnace toward the top of the machine where the glass is cut off, trimmed, inspected, and sorted.

According to usual practices, there is within the workpit a clay block 16 which has a slit through which the molten glass is drawn as it passes upwardly into the layer. Also, according to conventional practices, there may be an annealing box 18 at the base of the machine which may include gas burners or the like for maintaining the proper temperature conditions within the lehr and, therefore, in the sheet of glass being drawn through the machine.

The aforementioned rollers 14, at least in the lowermost portion of the machine, include the combination of a fixed roller and a movable roller. As will be seen in FIGURE 2, the fixed roller is identified by reference numeral 14a and the movable roller, which is swingable bodily toward and away from the fixed roller, is identified by reference numeral 14b.

According to the present invention, the fixed roller 14a has a shaft 20 which is journaled in a bearing located in a housing 22 that is a part of a support frame 24 fixed to side wall 26 of the machine.

The roller 14b, on the other hand, has its shaft 28 journaled in a bearing located in bearing housing 30 that is a part of a swinging frame 32 that is swingably supported on frame 24 as by means of a pivot shaft 34. Roller 14b is biased toward roller 14a by counterweight means 36 adjustably mounted on an arm 38 attached to frame 32 and extending laterally therefrom.

The above described arangement of the support frames for the rollers may be substantially identical with the corresponding frame structure of the above identified Hart patent, 2,571,239 and, to this end, a coolant fluid may be passed therethrough with the supply and return of the coolant being effected by way of pipes 40 and 42 and the connecting tube means, a portion thereof being indicated at 44 and 46.

Inasmuch as roller 14b is swingable, slot means 48 is provided in side wall 26 of the machine and in frame 24 for permitting the necessary movement of the shaft for the roller. An excessive amount of heat is prevented from escaping from this slot means by a shield or baffle member 50 mounted for movement with shaft 28.

According to the present invention, there is arranged in spaced relation to frames 24 and 32 a drive arrangement consisting of a gear housing 60 for each pair of drawing rollers. Housing 60 may be supported in any suitable manner as by being bolted to frame 24, or by being supported on the frame of the machine by brackets or the like secured to side wall 26 of the machine. Each gear housing 60 has journaled therein a pair of worm wheels 62 and 64 which mesh with a common drive worm 66 mounted on a drive shaft 68.

Worm wheel 62 is drivingly connected with shaft 20 of fixed roller 14a by means of a first universal joint assembly 70 while worm wheel 64 is similarly connected with the shaft means 28 of swingable roller 14b by a second universal joint assembly 72. At this point, it will be noted that each of shafts 20 and 28 is journaled in the frame of the machine while each of worm wheels 62 and 64 is journaled in the gear housing as by bearings 74 so that the universal joint assemblies 70 and 72 have merely to float between the worm wheels and the rolls pertaining thereto and to transmit drive torque therebetween.

Each universal joint assembly is constructed as indicated in FIGURE 5 wherein universal joint assembly 72 is illustrated. This universal joint assembly actually consists of two individual universal joints 72a and 72b. Joint 72a has an input drive yoke 76, and output drive yoke 78, and a drive block 80 pivotally connected with the arms of the said yokes. Output yoke 78 has fixed thereto a length of splined shaft 82 which is slideably received in the splined end of the input yoke 84 of universal joint 72b which also includes an output yoke 86 drivingly connected with shaft means 28 and a block 88 between the yokes pivoted thereto.

The splined shaft permits lengthening and shortening of the universal joint assemblies and, in particular, universal joint assembly 72 which will lengthen and shorten as roller 14b moves toward and away from fixed roller 14a. The driving connection between worm wheel 64 and the shaft 28 of roller 14b is, however, maintained in all positions of the roller 14b on account of the aforementioned splined shaft.

The shaft 68 may be driven in any suitable manner, as by means of drive motor M diagrammatically designated in FIGURE 1. FIGURE 1 will also show the coolant supply tank 80 and the pump means 82 by means of which the coolant is circulated through the aforementioned pipes and tubing.

It will be understood that both ends of the rollers are supported in the same manner in anti-friction bearings and which may be mounted in cooling boxes, but the drives for the rollers would all be located at one side only of the machine.

It will further be understood that while this invention has been particularly illustrated and described in connection with a Fourcault type drawing machine, it would be useful also in connection with other types of glass drawing machines and with equipment of a similar nature involving drive arrangements of this general type.

While the drive arrangement of the present invention has been shown as consisting of a single worm driving two worm wheels, it will be understood that there could be circumstances arising where two worms would be employed. For example, the rolls might be of such diameter that the worm wheels, when of a practical size, would be spaced apart so far that it would require two worms to drive the worm wheels.

It will thus be understood that it is desired to comprehend within the purview of this invention arrangements where the worm wheels are flexibly connected with their driven rolls and are each driven by an independent worm.

It will be understood that this invention is susceptible to modification in order to adapt it to different usages and conditions, and, accordingly, it is desired to comprehend such modifications within this invention as may fall within the scope of the appended claims.

I claim:

1. In a glass machine for drawing a sheet of glass from a bath of molten glass and passing it between the relatively-opposed rolls of each of a plurality of pairs of said rolls, a roll driving mechanism comprising a plurality of gear housings in vertically aligned relation, a pair of worm wheels journaled in each housing in axially parallel laterally spaced relation for rotation about horizontal axes, all of said wheels being of identical diameter and pitch, a vertical worm shaft supported through the respective housings for rotation about a vertical axis medially between the spaced worm wheels of each pair, worms of similar thread and of equal diameter and pitch fixed on said shaft within the respective housings, each worm being disposed between and in meshing relation with both of the worm wheels in its respective housing to drive said worm wheels simultaneously and at equal rotational speeds in opposite directions and to coordinate the rotary movement of all of said pairs of worm wheels, said worm shaft cnstituting the sole interconnection between the several pairs of worm wheels for governing the relative rotary movement of the worm wheels, and means for transmitting rotation from said worm wheel of each pair to the respective rolls of one of said pairs of rolls.

2. In a glass machine for drawing a sheet of glass from a bath of molten glass and passing it between the relatively-opposed rolls of each of a plurality of pairs of said rolls, a roll driving mechanism comprising a plurality of gear housings in vertically aligned relation, a pair of worm wheels journaled in each housing in axially parallel laterally spaced relation for rotation about horizontal axes, all of said wheels being of identical diameter and pitch, a vertical worm shaft supported through the respective housings for rotation about a vertical axis medially between the spaced worm wheels of each pair, worms of similar thread and of equal diameter and pitch fixed on said shaft within the respective housings, each worm being disposed between and in meshing relation with both of the worm wheels in its respective housing to drive said worm wheels simultaneously and at equal rotational speeds in opposite directions and to coordinate the rotary movement of all of said pairs of worm wheels, said worm shaft constituting the sole interconnection between the several pairs of worm wheels for governing the relative rotary movement of the worm wheels, and linearly extensible universally jointed output shafts operatively interconnecting the worm wheels of each pair to the respective rolls of one of said pairs of rolls, to transmit rotation to said rolls from the worm wheels.

References Cited by the Examiner

UNITED STATES PATENTS

| 544,780 | 8/1895 | Winters | 74—427 |
| 1,148,641 | 8/1915 | Welch | 74—424.8 |
| 1,641,920 | 9/1927 | Clark | 226—176 |
| 1,805,329 | 5/1931 | Escole | 65—193 |

FOREIGN PATENTS 555,961  9/1943  Great Britain.

DONALL H. SYLVESTER, *Primary Examiner.*

D. CRUPAIN, *Assistant Examiner.*